(12) United States Patent
Landler

(10) Patent No.: US 11,453,560 B2
(45) Date of Patent: Sep. 27, 2022

(54) DEVICE FOR HOLDING A CONTAINER AND TREATMENT DEVICE

(71) Applicant: KRONES AG, Neutraubling (DE)

(72) Inventor: Bruno Landler, Neutraubling (DE)

(73) Assignee: KRONES AG, Neutraubling (DE)

( * ) Notice: Subject to any disclaimer, the term of this patent is extended or adjusted under 35 U.S.C. 154(b) by 212 days.

(21) Appl. No.: 16/633,489

(22) PCT Filed: Jul. 26, 2018

(86) PCT No.: PCT/EP2018/070352
§ 371 (c)(1),
(2) Date: Jan. 23, 2020

(87) PCT Pub. No.: WO2019/020771
PCT Pub. Date: Jan. 31, 2019

(65) Prior Publication Data
US 2021/0130109 A1 May 6, 2021

(30) Foreign Application Priority Data
Jul. 26, 2017 (DE) ..................... 10 2017 116 921.0

(51) Int. Cl.
*B65G 47/86* (2006.01)
*B25J 15/00* (2006.01)
*B67C 7/00* (2006.01)

(52) U.S. Cl.
CPC ........ *B65G 47/847* (2013.01); *B25J 15/0028* (2013.01); *B25J 15/0038* (2013.01);
(Continued)

(58) Field of Classification Search
CPC .......... B65G 47/847; B65G 2201/0247; B65G 2207/00; B25J 15/0028; B25J 15/0038; B67C 7/004
See application file for complete search history.

(56) References Cited

U.S. PATENT DOCUMENTS 6,959,953 B2 * 11/2005 Graffin ................... B67B 3/206
198/470.1
8,672,376 B1 * 3/2014 Wilson ................. B25J 15/0028
294/99.1
(Continued)

FOREIGN PATENT DOCUMENTS

CN   102007055 A   4/2011
EP   1867600       12/2007
(Continued)

*Primary Examiner* — Stephen A Vu
(74) *Attorney, Agent, or Firm* — Haynes and Boone, LLP

(57) ABSTRACT

A device for holding a container in a container treatment device, for example for holding a bottle at the bottle neck thereof, includes a first clasp arm, which is arranged on a clasp carrier so as to be pivotable about a first pivot axis, and a second clasp arm, which is arranged on the clasp carrier so as to be pivotable about a second pivot axis. The first clasp arm is of longer design than the second clasp arm. The first clasp arm and the second clasp arm are pivotally coupled to one another via a coupling arrangement, wherein the clasp arms are magnetically preloaded into a closed position, and the clasp arms can be opened to receive a container passively by inserting the container. A treatment device for treating a container is also described.

20 Claims, 7 Drawing Sheets

(52) U.S. Cl.
CPC ...... *B67C 7/004* (2013.01); *B65G 2201/0247* (2013.01); *B65G 2207/00* (2013.01)

(56) References Cited

U.S. PATENT DOCUMENTS

| | | | |
|---|---|---|---|
| 8,833,824 B2* | 9/2014 | Fahldieck | B65G 47/847 294/90 |
| 9,878,483 B2* | 1/2018 | Leroux | B29C 49/4205 |
| 2008/0272609 A1* | 11/2008 | Knieling | B65G 47/847 294/90 |
| 2011/0198198 A1 | 8/2011 | Michel | |

FOREIGN PATENT DOCUMENTS

| | | |
|---|---|---|
| EP | 2881345 | 6/2015 |
| WO | WO 2008/007414 | 1/2008 |
| WO | WO 2011/015371 | 2/2011 |
| WO | WO 2011/121624 | 10/2011 |

* cited by examiner

DEVICE FOR HOLDING A CONTAINER AND TREATMENT DEVICE

CROSS REFERENCE TO RELATED APPLICATIONS

This application is a national stage of International Application No. PCT/EP2018/070352, filed Jul. 26, 2018, which claims priority from German Patent Application No. 10 2017 116 921.0 filed on Jul. 26, 2017 in the German Patent and Trademark Office, the disclosures of which are incorporated herein by reference in their entirety.

BACKGROUND

Technical Field

The present invention relates to a device for holding a container in a container treatment device, for example, for holding a bottle at the bottle neck thereof, and to a treatment device for treating a container, for example, for transporting a container in a beverage filling plant.

Related Art

Devices for holding and transporting containers in beverage filling plants are known. In the case of the devices for holding containers, a distinction is drawn inter alia between devices in which the container stands on a transfer table in its bottom region and devices in which the container is held in the neck region and is transported while suspended. The latter is also referred to as "neck handling".

Containers held by the neck region are held by means of clasps, wherein the clasps engage in a locating region of the container below a neck ring, for example. The clasps are designed to hold containers of a certain container size or of certain neck dimensions. If containers of a different container size and/or of different neck dimensions are to be transported, the clasps thereof must be replaced. This conversion gives rise to stoppage times. Moreover, conversion requires external intervention. Particularly in the case of aseptic systems, such an external intervention requires subsequent sterilization in order to reestablish operational readiness.

In order to take account of these disadvantages, there are known devices which have clasp arms of asymmetrical design.

WO 2008/007414 A1 shows a container clasp having two gripping arms of asymmetric design for positioning a container mounted on a support, said arms being actively controlled by means of a cam and gearwheel toothing. WO 2011/121624 A1 also shows an active clasp.

Devices in which magnets are provided for active control of the clasp arms are furthermore known. A corresponding device can be found in US 2011/0198198 A1, for example.

In the case of clasps of two-part design which do not have toothing, the gripped container may, depending on the quality of transfer, be positioned eccentrically with respect to its theoretical reference circle position and may thus not be precisely under the valve at the filler, leading to incorrect filling or to spilling over of product introduced into the container.

In the case of two-part clasps with toothing, in which a first clasp arm and a second clasp arm are synchronized, the container is theoretically held centrally by the symmetry of the grippers. However, one disadvantage here is the complex toothing of the clasp arms in relation to one another and the complex construction of an active control system for opening the clasps, which are both expensive and require a lot of maintenance. In this case, a hygienic embodiment is furthermore almost impossible to implement owing to the gearwheel transmission and the parts capable of moving relative to one another, which are required for active control to open the clasps.

SUMMARY

An improved device for holding a container is described according to various embodiments.

Accordingly, a device for holding a container in a container treatment device, for example, for holding a bottle at the bottle neck thereof, is proposed, including a first clasp arm, which is arranged on a clasp carrier so as to be pivotable about a first pivot axis, and a second clasp arm, which is arranged on the clasp carrier so as to be pivotable about a second pivot axis, wherein the first clasp arm is of longer design than the second clasp arm, and wherein the first clasp arm and the second clasp arm are pivotally coupled to one another via a coupling arrangement. The clasp arms are magnetically preloaded into a closed position, and the clasp arms can be opened to receive a container passively by inserting the container.

By virtue of the fact that the clasp arms are magnetically preloaded into a closed position, it is possible to ensure that the clasp is always in the closed position. By virtue of the fact that the clasp arms can be opened in a purely passive way by inserting the container, it is possible to dispense with a complex design which would otherwise be required for active opening of the clasp arms. In other words, no arrangement for actively opening the clasp arms is provided on the device. It is therefore not possible actively to perform opening during operation in the absence of a container. This is therefore what is referred to as a passive device.

Accordingly, the opening of the clasp arms takes place passively through the insertion of the container into the clasps. This means that the container can be inserted into the clasp by being pressed from the outside into the clasp formed by the two clasp arms. During this process, the clasp arms are pivoted outward against the magnetic preload by the container wall. Consequently, the clasp arms open in a purely passive way due to displacement by the container during insertion.

In accordance with the position of the largest dimension, generally the largest diameter of the container, the clasp arms are first of all moved outward into an open position and, during insertion, slide back in the direction of the closed position along the contour of the container. In the correct received position of the container in the device, the clasp arms clasp the container. By means of the magnetic force which preloads the clasp arms into the closed position, a holding force is accordingly exerted on the container by the clasp arms.

By virtue of the fact that no arrangement for actively opening the clasp arms is necessary, it is also impossible for any contaminants and/or germs to settle there. Consequently, the passive opening makes the device particularly suitable for uses involving high hygiene requirements, such as aseptic systems. Moreover, a device designed in this way has a simplified construction in comparison with devices in which the clasp arms are opened actively and, furthermore, devices of this kind correspondingly require less maintenance and are less expensive to produce.

According to some embodiments, the first pivot axis is arranged further away from a receiving side, on which the container is received by the device or is fed to the latter, than the second pivot axis. In other words, when the device is arranged on a star wheel or a treatment carousel, the second pivot axis is arranged offset radially outward relative to the first pivot axis, in relation to a center of rotation of the star wheel or of the treatment carousel. Consequently, the first pivot axis is situated on a reference circle with a smaller reference circle diameter than another reference circle diameter, on which the second pivot axis is situated. As a result, the second clasp arm can be of particularly short design. To produce the second clasp arm, only a low outlay on material is accordingly required. Moreover, the arrangement of the second pivot axis closer to the receiving side makes it possible to achieve advantageous distribution or division of the clamping forces which are exerted on a held container by the first clasp arm and the second clasp arm. In particular, it is possible in this way to ensure that a constant clamping force is exerted on the held container at all times, even when receiving various container types of different sizes.

To ensure that the center or central axis of each container type held relative to the device is always at the same location, that is to say that the center or central axis is on the same reference circle diameter for each container size, the first pivot axis and the center or central axis of the container held in the clasp arms are, according to certain embodiments, situated on a line which, based on a device being arranged on a treatment carousel, intersects an axis of rotation of the treatment carousel.

If, according to several embodiments, the first clasp arm forms two contact points with a container held in the device, and the second clasp arm forms one contact point with the container held in the device, defined, geometrically unambiguously determined reception of the container in the clasp arms is achieved.

In this way, inaccuracies of production or tolerances of the container and/or of the clasp arms can be compensated without leading to undetermined or overdetermined reception of the container and, as a result, tilting of the container in the receptacle or offsetting of the container from the predetermined position in the device, for example.

According to various embodiments, the first clasp arm has a first contact region with a curvature greater than a curvature of a locating region of a smallest container type, by which the container of the smallest container type is held by the device, and has a second contact region, situated closer to the first pivot axis than the first contact region, with a curvature smaller than the curvature of a locating region of a largest container type, by which the container of the largest container type is held by the device.

Purely for the sake of illustration, in the case of a precisely circular locating region for example, a locating region of larger curvature has a smaller radius of the circular locating region than a locating region of smaller curvature which has a larger radius of the circular locating region. Accordingly, a straight line has a curvature of zero.

By virtue of the fact that the first contact region has a curvature greater than a curvature of a locating region of a smallest container type, even a container of the smallest container type held in the device is not held over a surface but in a defined manner at two points by the first clasp arm. The provision of the second contact region closer to the first pivot axis ensures that even large container types can be held reliably by the first clasp arm. As a result, the first clasp arm can simultaneously be of very compact construction.

According to certain embodiments, the first clasp arm has both contact points in the first contact region when receiving a container of the smallest container type, and the first clasp arm has an outer contact point in the first contact region and an inner contact point in the second contact region when receiving a container of the largest container type. The two contact points with the held container which are each formed on the first clasp arm can thus each be provided with an ideal spacing. Reliable holding of each container type is thereby achieved.

In another embodiment, the second clasp arm has a contact region, the curvature of which is smaller than the curvature of a locating region of a largest container type, by which the container of the largest container type is held by the device. As a result, there is only ever one contact point formed between a container held in the device and the second clasp arm.

In order to achieve a particularly robust and low-maintenance device on which contaminants can settle only to a small extent, the coupling device can be in the form of a peg element arranged on the first clasp arm and of a pocket element which is in engagement with the peg element and is arranged on the second clasp arm.

The peg element generally has a rounded surface which allows sliding relative to at least one pocket element face of complementary design.

In other words, the peg element and the pocket element typically form a joint-type connection by means of which a torque acting on one of the two clasp arms, for example on the first clasp arm, can be transmitted to the other clasp arm, for example the second clasp arm. By means of the coupling arrangement, the first and the second clasp arm are coupled kinematically to one another, i.e. the second clasp arm always has a predetermined position relative to a position of the first clasp arm, said position being predetermined by the coupling arrangement.

According to another embodiment, the peg element includes a softer material than the pocket element, at least in a zone of contact with the pocket element, wherein the peg element generally includes a plastic, for example polyethylene terephthalate (PET), polyoxymethylene (POM) or a polyetherketone (PEK), for example poly(ether ether ketone) (PEEK), poly(aryl ether ketone) (PAEK), poly(ether ketone ketone) (PEKK), poly(ether ether ether ketone) (PEEEK), poly(ether ether ketone ketone) (PEEKK) or poly(ether ketone ether ketone ketone) (PEKEKK), and/or the pocket element includes a steel alloy, for example a stainless steel, for example a premium steel alloy. As a result, there is essentially only abrasion or wearing of the softer material of the peg element during a relative movement of the peg element and the pocket element. Consequently, the peg element can be provided as a defined wearing element. During maintenance, it is only ever the peg element or the soft material thereof at least in the contact zone which has to be replaced.

According to some embodiments, in order to obtain a particularly simple construction and a low maintenance requirement for the device, the peg element is in the form of a mounting element for mounting on the first clasp arm, wherein the mounting element generally has a receptacle for receiving a magnet.

According to one embodiment, to provide the magnetic preload on the clasp arms, the first clasp arm has a magnet, and/or the clasp carrier has at least one carrier magnet acting on a magnet or on a ferromagnetic material of the first clasp arm.

According to another embodiment, in order to achieve a particularly compact construction and a strong magnetic preload, at least one contact region of the first clasp arm and a magnet of the first clasp arm are arranged on opposite sides of the clasp arm in relation to the first pivot axis.

A treatment device for treating a container, for example for transporting a container in a beverage filling plant is also described.

The treatment device for treating a container, for example for transporting a container in a beverage filling plant, includes a treatment carousel and at least one device, arranged on the treatment carousel, for holding a container as per one of the above embodiments.

BRIEF DESCRIPTION OF THE FIGURES

Further embodiments of the invention are explained in greater detail by means of the following description of the figures.

DETAILED DESCRIPTION

Illustrative embodiments are described below with reference to the figures. In this context, elements which are the same, similar or have the same action are provided with identical reference signs in the various figures, and repeated description of these elements is in some cases omitted in order to avoid redundancy.

Figure 1:
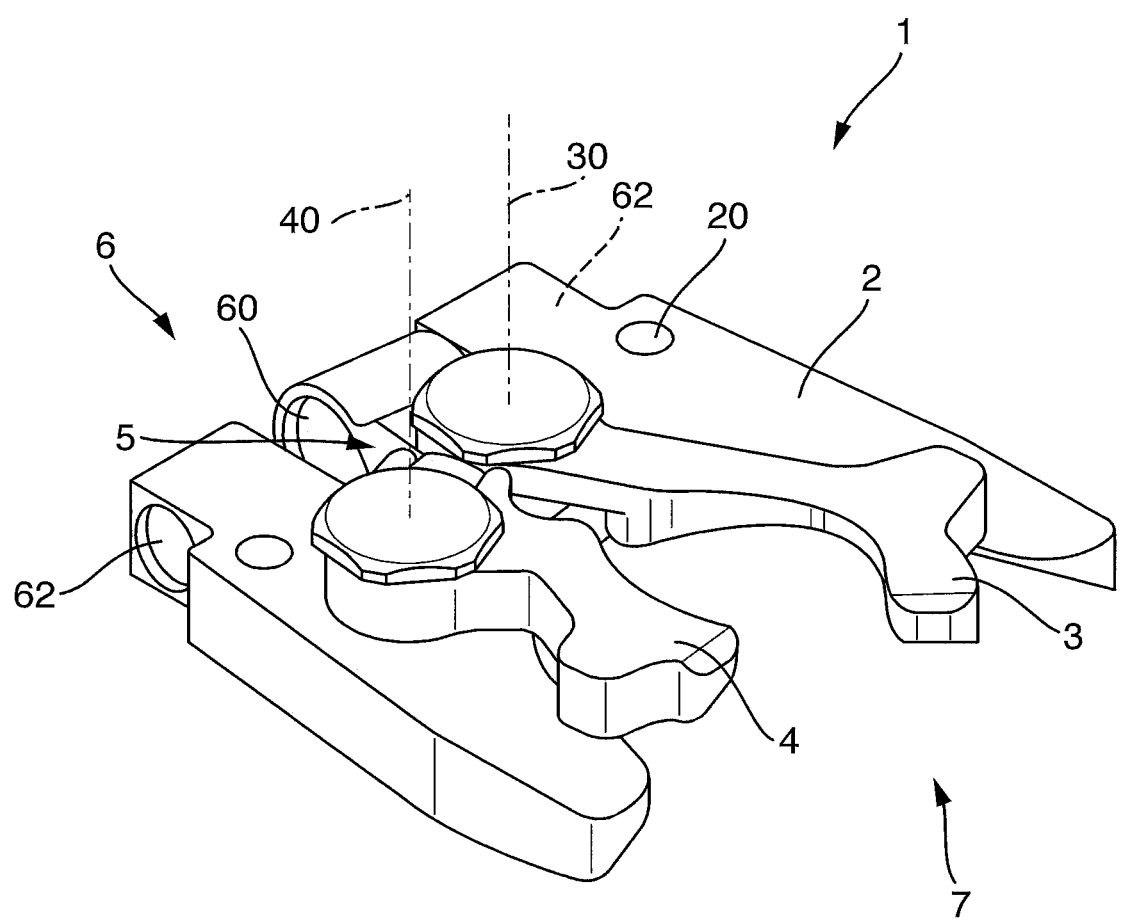
FIG. 1 shows schematically a perspective side view of a device for holding a container.

FIG. 1 shows schematically a perspective side view of a device 1 for holding a container. The device 1 has a clasp carrier 2, which can be attached to a transport device, in particular a star wheel or a treatment carousel, of a container treatment machine by means of fastening elements 20, here in the form of holes.

A first clasp arm 3 is arranged on the clasp carrier 2 so as to be pivotable about a first pivot axis 30. A second clasp arm 4 is furthermore arranged on the clasp carrier 2 so as to be pivotable about a second pivot axis 40. The first and the second clasp arm 3, 4 together form a clasp in which a container to be held can be held.

The first clasp arm 3 and the second clasp arm 4 are preloaded magnetically into a closed position. In order to achieve the magnetic preload, the device 1 has a magnet arrangement 6, wherein the first clasp arm 3 has a magnet 60, on which a magnetic force of two carrier magnets 62 arranged on the clasp carrier 2 acts. By means of the magnetic force, the first clasp arm 3 is pushed in the direction of the second clasp arm 4 on a receiving side 7, from which a container to be held is fed to the device 1 or can be received.

The first clasp arm 3 and the second clasp arm 4 are pivotally coupled to one another by means of a coupling device 5, with the result that, when there is a movement of the first clasp arm 3, the second clasp arm 4 undergoes a corresponding movement and vice versa. In other words, the coupling device 5 specifies a position of the first clasp arm 3 relative to a position of the second clasp arm 4. In the present case, the first and the second clasp arm 3, 4 are coupled to one another in such a way that a movement of a clasp arm 3, 4 produces a corresponding countermovement of the other clasp arm 4, 3.

The clasp arms 3, 4 are preloaded magnetically into a closed position, thus ensuring that the clasp is always in the closed position. In this arrangement, the clasp arms 3, 4 can only be opened passively. Consequently, no arrangement for actively opening the clasp arms is provided on the device 1. The opening of the clasp arms 3, 4 takes place passively, i.e. by insertion or entry of the container into the clasp, wherein the container wall pushes the clasp arms 3, 4 apart during entry. A different, active opening process by the device 1 itself, in which the container does not interact with the clasp arms 3, 4, is not envisaged.

Figure 2:
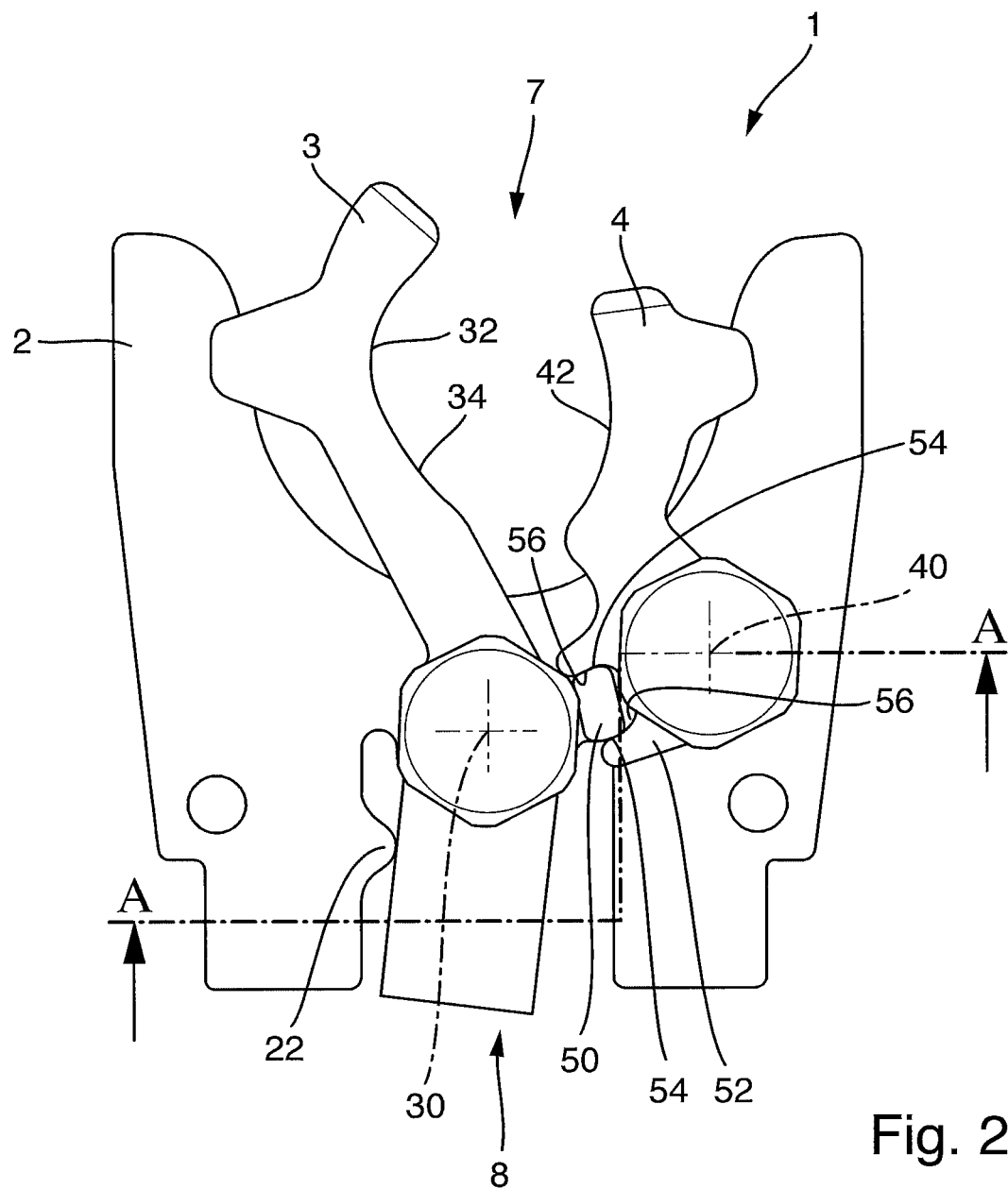
FIG. 2 shows schematically a plan view of the device from FIG. 1.

FIG. 2 shows schematically a plan view of the device 1 from FIG. 1. Relative to the receiving side 7, the first pivot axis 30 is arranged further away than the second pivot axis 40. In other words, when the device 1 is arranged on a treatment carousel of a treatment machine, the second pivot axis 40 is arranged offset radially outward relative to the first pivot axis 30, in relation to a center of rotation of the treatment carousel. Consequently, the first pivot axis 30 is situated on a reference circle with a smaller reference circle diameter than a reference circle diameter, on which the second pivot axis 40 is situated. Furthermore, the clasp arms 3, 4 are of asymmetric design, the first clasp arm 3 being of significantly longer design than the second clasp arm 4.

The first clasp arm 3 is designed in such a way that it forms two contact points with a container (not shown) held in the device 1, wherein the first clasp arm 3 has a first contact region 32 with a curvature greater than a curvature of a locating region or neck section of a smallest container type, by which the container of the smallest container type is held by the device 1, and has a second contact region 34, situated closer to the first pivot axis 30 than the first contact region 32, with a curvature smaller than the curvature of a locating region or neck section of a largest container type, by which the container of the largest container type is held by the device 1.

The second clasp arm 4 is designed in such a way that it forms just one contact point with a container held in the device 1. In order to achieve this, the second clasp arm 4 has a contact region 42, the curvature of which is smaller than the curvature of a locating region of a largest container type, by which the container of the largest container type is held by the device 1.

The coupling device 5 is situated substantially between the first pivot axis 30 and the second pivot axis 40 and is in the form of a peg element 50 formed on the first clasp arm 3 and of a pocket element 52 which is in engagement with the peg element 50 and is formed on the second clasp arm 4. During a pivoting movement of the first clasp arm 3, the movement transmitted to the pocket element 52 by the peg element 50 ensures that the second clasp arm 4 undergoes a pivoting movement about the second pivot axis 40 which is counter to the pivoting movement of the first clasp arm 3.

In the region of a rear side 8 opposite the receiving side 7, the clasp carrier 2 has a stop 22, which limits the pivoting movement of the first clasp arm 3 on one side. By means of the stop 22, the pivoting angle of the first clasp arm 3 is limited in the clockwise direction with reference to FIG. 2. Accordingly, the position of the stop 22 prevents the clasp arms 3, 4 from being closed beyond the stop position. A maximum closed position of the clasp is thus predetermined by means of the stop 22.

The peg element 50 has surfaces 54 which are rounded on both sides and which allow sliding relative to faces 56 of complementary design on the pocket element 52.

In the region of the rounded surface, the peg element 50 includes a plastic, in the present case PEK. The pocket element 52 includes a stainless steel alloy and is consequently harder than the peg element 50. Accordingly, it is essentially only the peg element 50 which is subject to wear in the contact zones between the peg element 50 and the pocket element 52. Due to the large difference in the hardness of the materials of the pocket element 52 and of the peg element 50 and the associated unilateral wear on the part of the peg element 50, the latter is provided as a defined wearing part.

Consequently, abrasion takes place essentially only on the surfaces 54 which can give rise to irregularities and pores, and at or in which contaminants and germs can settle or be deposited. These contaminants can be removed by replacing the peg element 50 provided as a wearing part. It is not necessary to replace the pocket element 52.

Figure 3:
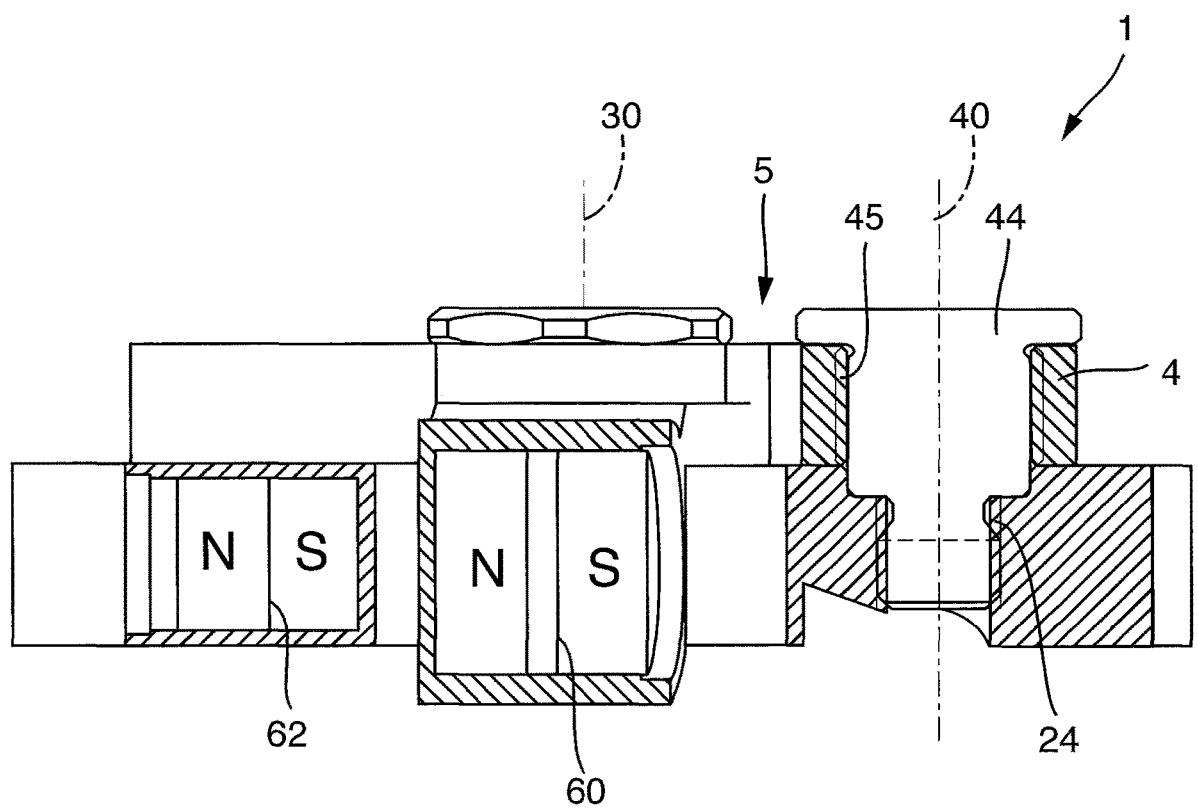
FIG. 3 shows schematically a section through the device from FIG. 2.

FIG. 3 shows schematically a section through the device 1 from FIGS. 1 and 2 along section line A-A from FIG. 2. The pocket element 52 is formed integrally with the second clasp arm 4. The latter is fastened to the clasp carrier 2 by means of a threaded bolt 44 and a threaded hole 24 in the clasp carrier 2. In order to allow a pivoting movement of the second clasp arm 4 around the threaded bolt 44, a wearing bush 45 is arranged between the threaded bolt 44 and the second clasp arm 4.

The section furthermore reveals one of the two carrier magnets 62 and the magnet 60 of the first clasp arm 3. The carrier magnet 62 and the magnet 60 are arranged in an antipolar configuration with respect to one another. Consequently, the carrier magnet 62 and the magnet 60 attract each other. The second carrier magnet, which is not shown in this view and which is indicated by the reference sign 62 in FIG. 1, is arranged in a corresponding homopolar configuration with respect to the magnet 60, with the result that the second carrier magnet, which is not shown in FIG. 3, and the magnet 60 repel each other. Due to the attraction between the first carrier magnet 62 and the magnet 60 and the repulsion between the second carrier magnet and the magnet 60, the first clasp arm 3 is subjected to a magnetic force which preloads the first clasp arm 3 and, via the coupling device 5, likewise the second clasp arm 4 into the closed position.

Figure 4:
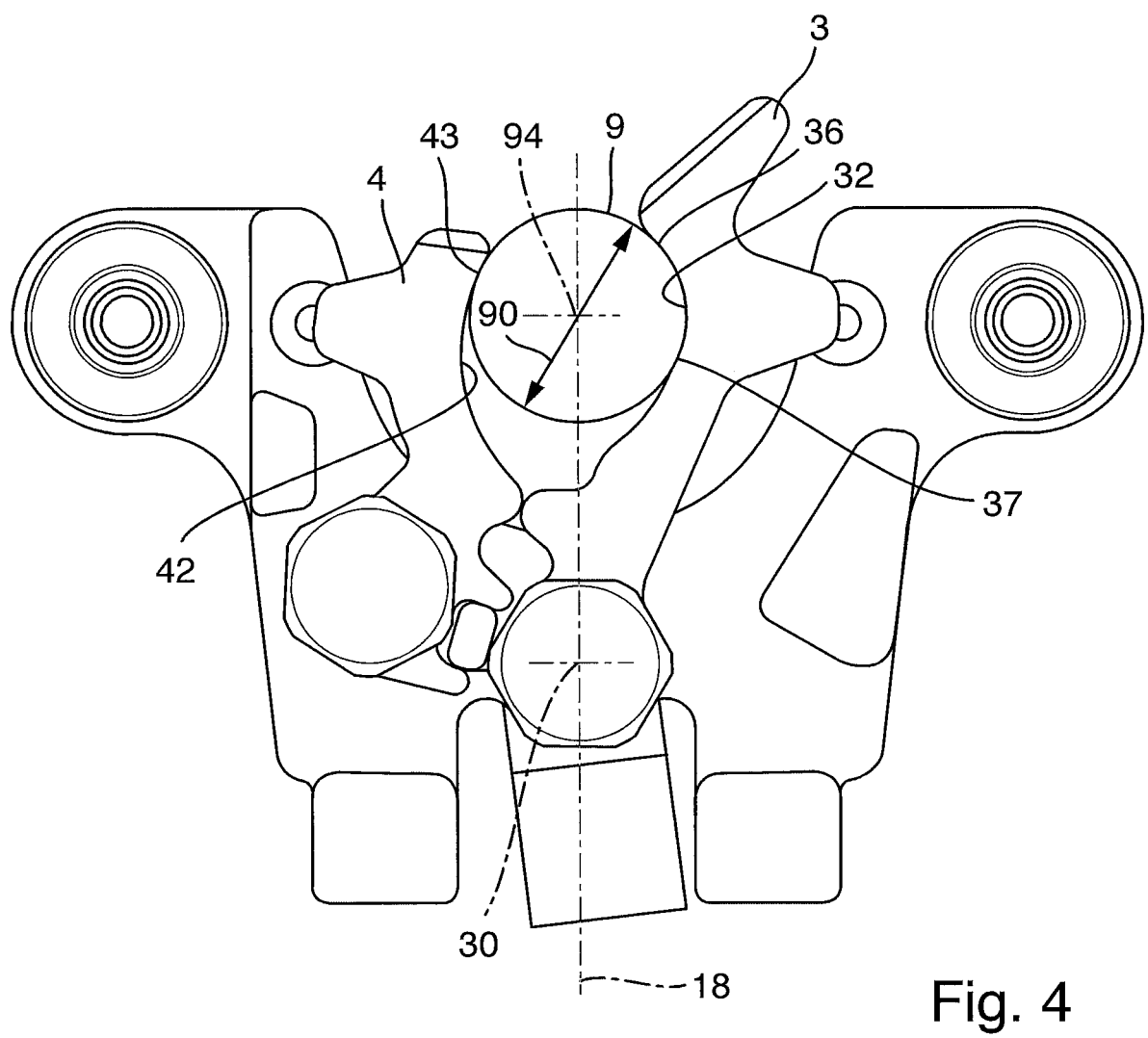
FIG. 4 shows schematically a plan view of a device holding a container, for holding a container according to another embodiment.

FIG. 4 shows schematically a plan view of a device 1 holding a container 9, for holding a container according to another embodiment. The device 1 corresponds substantially to the device from FIGS. 1 to 3. The container 9 shown schematically in FIG. 4 is a container of the smallest container type which the device 1 is designed to hold. Since the curvature of the first contact region 32 is greater than the curvature of the container 9 in the locating region thereof, which has a first container diameter 90, the first clasp arm 3 accordingly has two contact points 36, 37 with the container 9. The contact points 36, 37 are both arranged in the first contact region 32. The second clasp arm 4 has a contact point 43 with the container 9.

The central axis 94 of the container 9 in the first pivot axis 30 are on a line 18, which, when the device 1 is arranged on a treatment carousel, intersects an axis of rotation of the treatment carousel.

Figure 5:
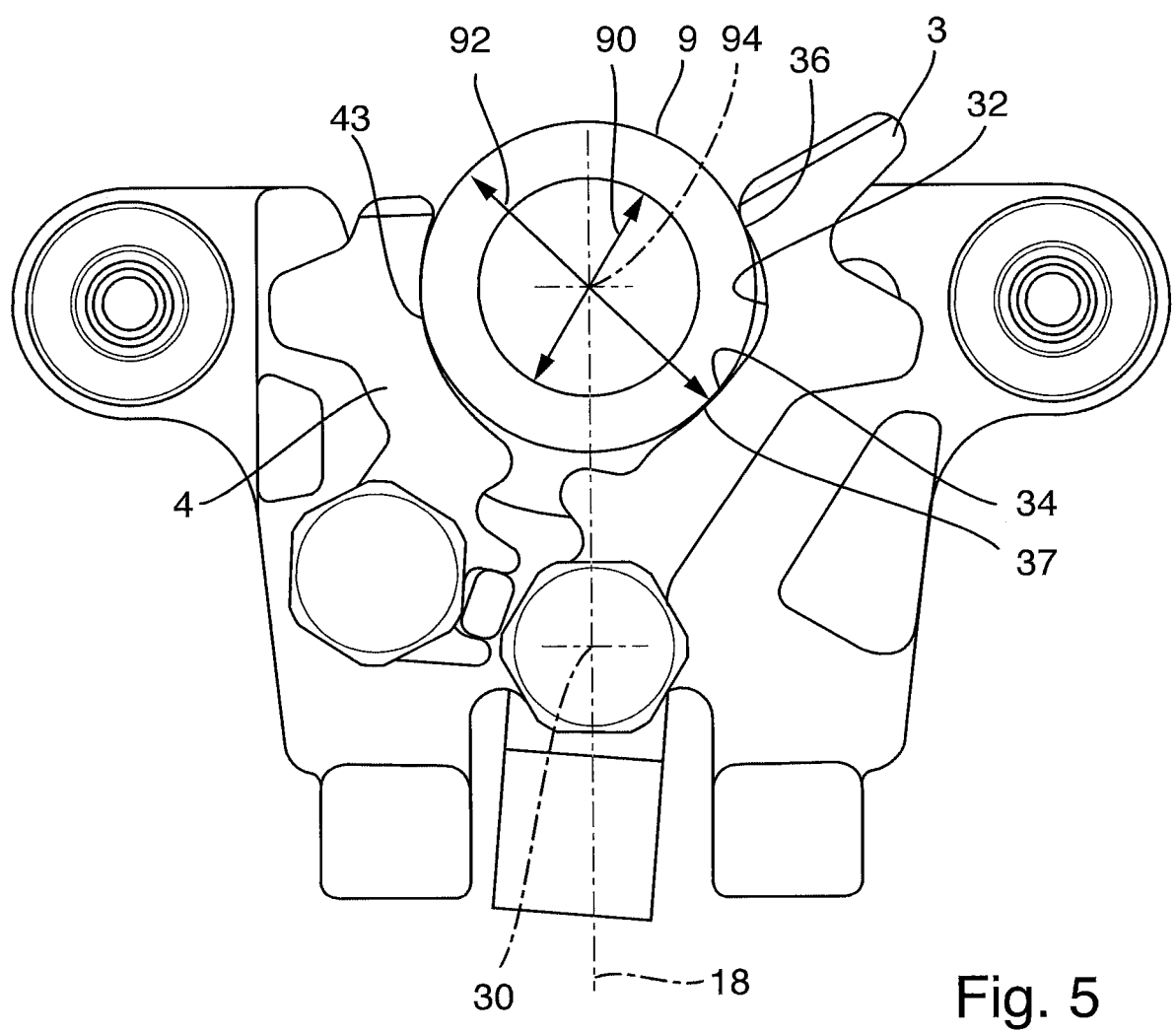
FIG. 5 shows schematically a plan view of the device from FIG. 4, holding a container of a different container type.

FIG. 5 shows schematically a plan view of the device 1 from FIG. 4 with a schematically indicated container 9 of another container type with a second container diameter 92, which is greater than the first container diameter 90. For illustration, the first container diameter is illustrated once again in dashes at reference sign 90.

The first clasp arm 3 forms a first, outer contact point 36 and the first contact region 32 and a second, inner contact point 37 in the second contact region 34. The second clasp arm 4 and the container 9 once again have just one contact point 43. This makes it possible for the central axis 94 of the larger container 9 to be in the same position as the central axis 94 of the smaller container 9 in FIG. 4.

The central axis 94 of containers 9 of various container types is thus always in the same position in relation to the device 1. In particular, the construction of the device 1 does not lead to offsetting of the central axis 94 along the line 18 when a different container type is received. Consequently, the device 1 is capable of enabling containers 9 of different container types to be guided along the same reference circle diameter in all cases.

The central axis 94 of the container 9 and the first pivot axis 30 are once again on a line 18, which, when the device 1 is arranged on a treatment carousel, intersects an axis of rotation of the treatment carousel.

Figure 6:
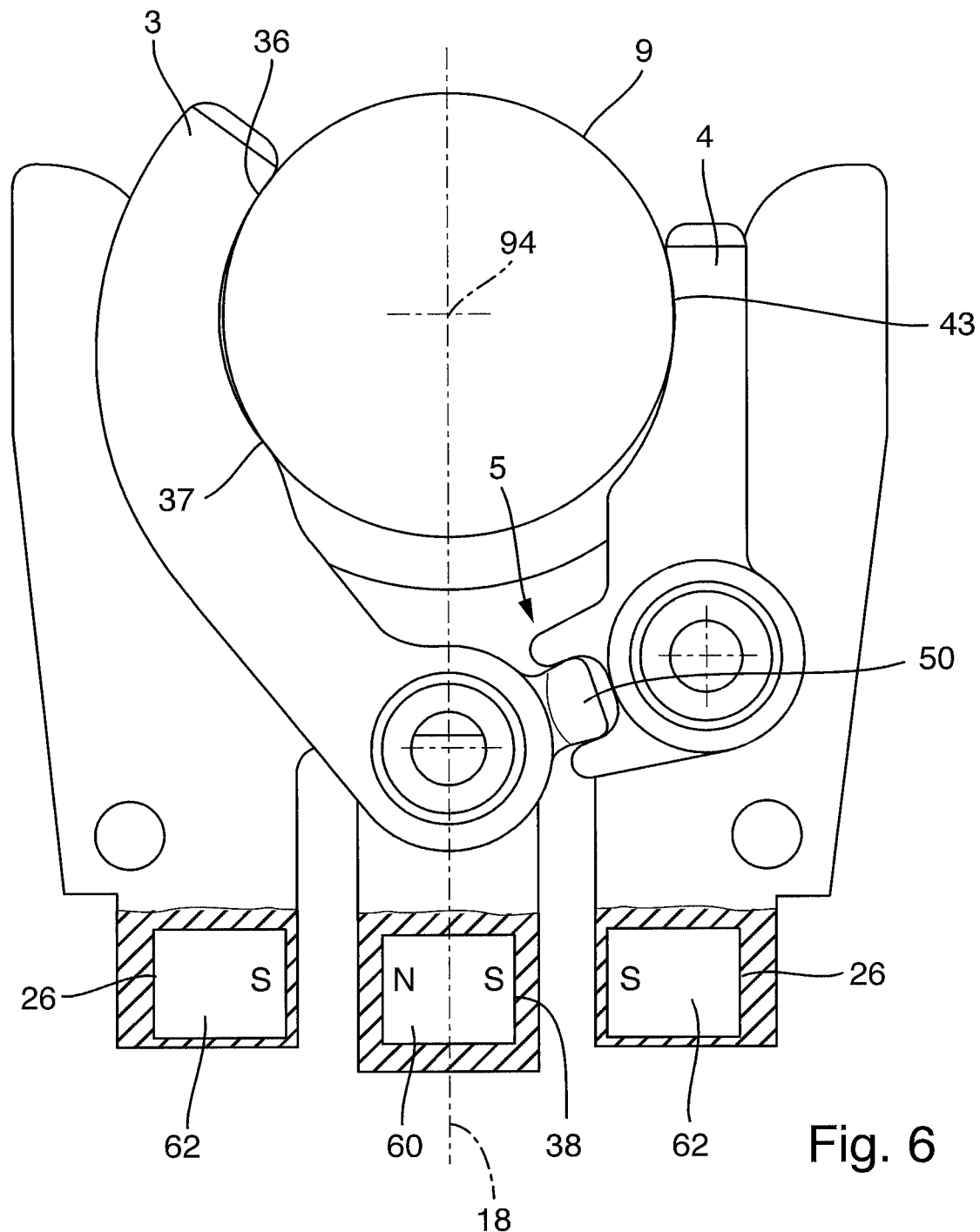
FIG. 6 shows schematically a plan view of a device according to yet another embodiment.

FIG. 6 shows schematically a plan view of a device 1 according to another embodiment. It corresponds in construction substantially to the abovementioned embodiments. The device 1 shown here holds a container 9 of a third container type. The first clasp arm 3 forms two contact points 36, 37 with the container 9, and the second clasp arm 4 forms one contact point 43 with the container 9.

Here, the peg element 50 is furthermore in the form of a mounting element composed of PEK for mounting on the first clasp arm 3, wherein the mounting element generally has a receptacle 38 closed by means of ultrasonic welding, in which the magnet 60 is received. The two carrier magnets 62 are arranged in corresponding receptacles 26 of the carrier 2 on both sides of the magnet 60.

Owing to the arrangement of the carrier magnets 62 and of the magnet 60, the clasp arms 3, 4 are subjected to a magnetic force, which produces a closing torque in the direction of the closed position of the clasp arms 3, 4 via the first pivot axis 30, the coupling device 5 and the second pivot axis 40, thus ensuring that the container 9 is held securely in the device 1.

Figure 7:
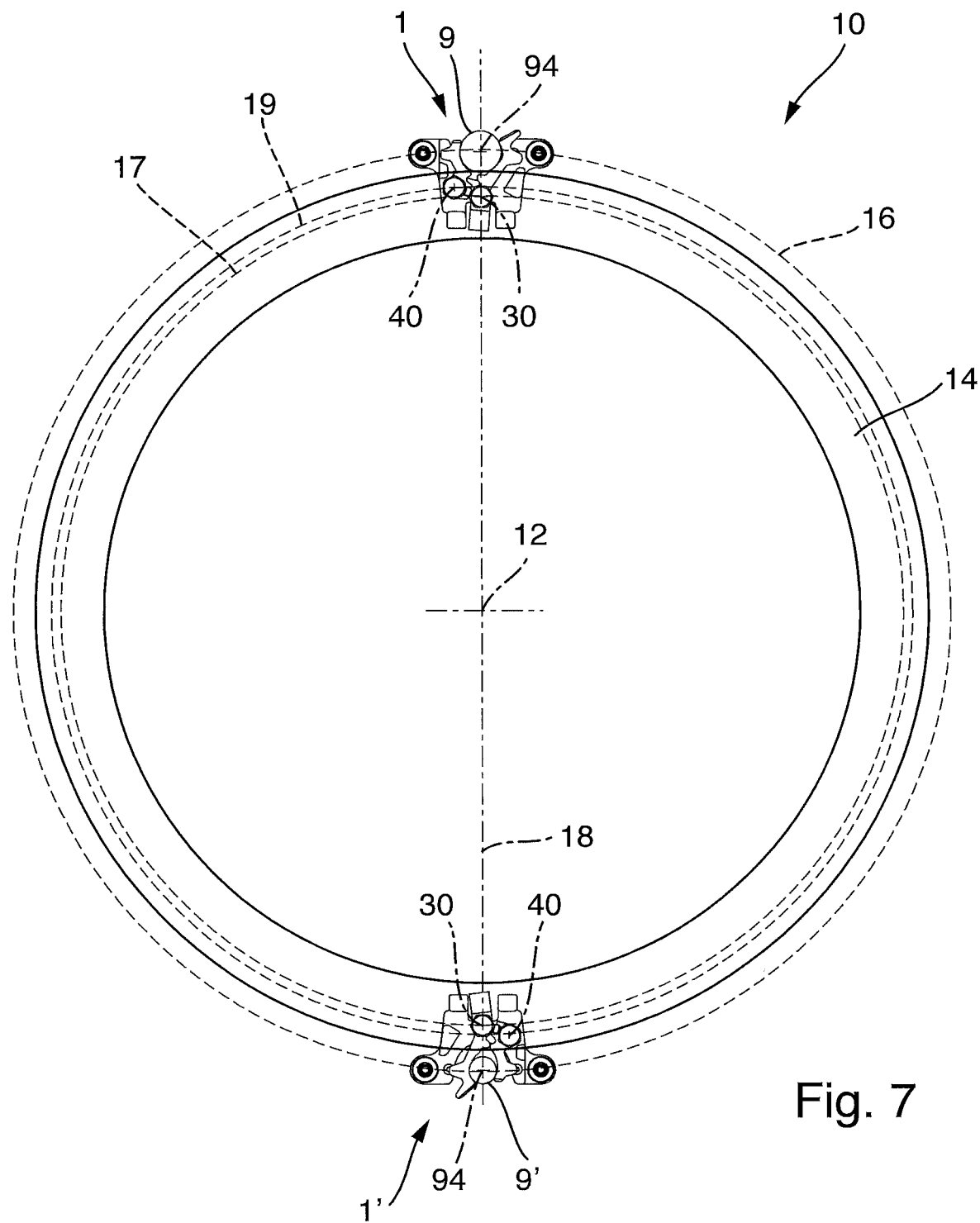
FIG. 7 shows schematically a plan view of a treatment device for treating a container.

FIG. 7 shows schematically a plan view of a treatment device 10 for treating a container. The treatment device 10 has a treatment carousel 14, on which a multiplicity of devices 1, 1' for holding a container is arranged, wherein in the present case a first device 1 is shown which holds a container 9 corresponding to FIG. 4, and a second device 1' is shown which holds a container 9' corresponding to FIG. 5. The central axes 94 of the two containers 9, 9' are situated on a common reference circle. Here, the devices are arranged on the treatment carousel in such a way that the line 18 intersects the axis of rotation 12 of the treatment carousel.

Furthermore, the reference circles 17, 19 of the pivot axes 30, 40 are shown. The reference circle 17 of the first pivot axis 30 is smaller than the reference circle 19 of the second pivot axis 40. Consequently, the first pivot axis 30 is arranged radially further inward in relation to the axis of rotation 12 than the second pivot axis 40, which is correspondingly offset radially outward relative to the first pivot axis 30.

Where applicable, all the individual features which are illustrated in the illustrative embodiments can be combined and/or interchanged with one another without exceeding the scope of the invention.

The invention claimed is:

1. A device for holding a container in a container treatment device, comprising:
a first clasp arm arranged on a clasp carrier and configured to be pivotable about a first pivot axis; and
a second clasp arm arranged on the clasp carrier and configured to be pivotable about a second pivot axis, wherein:
the first clasp arm is longer than the second clasp arm,
the first clasp arm and the second clasp arm are pivotally coupled to another via a coupling device,
the first clasp arm and the second clasp arm are magnetically preloaded into a closed position, and
the first clasp arm and the second clasp arm are configured to be opened to receive the container passively by inserting the container and without assistance of an actuator.

2. The device of claim 1, wherein the first pivot axis is arranged further away from a receiving side, on which the container is received by the device, than the second pivot axis.

3. The device of claim 1, wherein the first clasp arm forms two contact points with the container, and the second clasp arm forms one contact point with the container.

4. The device of claim 3, wherein:
the first clasp arm has a first contact region with a curvature greater than a curvature of a neck region of a first container, wherein the first container is a smallest size container that can be held by the device, and
the first clasp arm has a second contact region situated closer to the first pivot axis than the first contact region and the second contact region has a curvature smaller than a curvature of a neck region of a second container, wherein the second container is a largest size container that can be held by the device.

5. The device of claim 4, wherein:
the first clasp arm has the two contact points in the first contact region when receiving the first container, and
the two contact points comprise an outer contact point in the first contact region and an inner contact point in the second contact region when receiving the second container.

6. The device of claim 1, wherein the second clasp arm has a contact region with a curvature that is smaller than a neck region of a second container, wherein the second container is a largest size container that can be held by the device.

7. The device of claim 1, wherein the coupling device comprises:
a peg element arranged on the first clasp arm, and
a pocket element in engagement with the peg element and arranged on the second clasp arm.

8. The device of claim 7, wherein:
the peg element comprises a softer material than the pocket element at least in a zone of contact with the pocket element, and
the pocket element comprises a steel alloy.

9. The device of claim 8, wherein the softer material comprises a plastic and the steel alloy comprises a premium steel alloy.

10. The device of claim 9, wherein the plastic comprises polyethylene terephthalate (PET), polyoxymethylene (POM), or a polyetherketone (PEK).

11. The device of claim 10, wherein the PEK comprises poly(ether ketone) (PEEK), poly(aryl ether ketone) (PAEK), poly(ether ketone ketone) (PEKK), poly(ether ketone) (PEEEK), poly(ether ketone ketone), (PEEKK) or poly(ether ketone ether ketone ketone) (PEKEKK).

12. The device of claim 7, wherein the peg element comprises a mounting element configured to be mounted on the first clasp arm, and the mounting element comprises a receptacle configured to receive a magnet.

13. The device of claim 1, wherein the first clasp arm comprises a magnet.

14. The device of claim 13, wherein the clasp carrier comprises at least one carrier magnet configured to act on the magnet.

15. The device of claim 13, wherein at least one contact region of the first clasp arm and the magnet are arranged on opposite sides of the first clasp arm in relation to the first pivot axis.

16. A treatment device for treating a container in a beverage filling plant, comprising:
a treatment carousel; and
the device of claim 1 arranged on the treatment carousel.

17. The treatment device of claim 16, wherein the first pivot axis and a central axis of the container held in the first clasp arm and the second clasp arm are situated on a line which, based on the device being arranged on the treatment carousel, intersects an axis of rotation of the treatment carousel.

18. A device for holding a container in a container treatment device, comprising:
a first clasp arm arranged on a clasp carrier and configured to be pivotable about a first pivot axis; and
a second clasp arm arranged on the clasp carrier and configured to be pivotable about a second pivot axis, wherein:
the first clasp arm is longer than the second clasp arm,
the first clasp arm and the second clasp arm are pivotally coupled to another via a coupling device,
the first clasp arm comprises a magnet,
the clasp carrier comprises two carrier magnets, one carrier magnet arranged in an antipolar configuration with respect to the magnet and the other carrier magnet arranged in a homopolar configuration with respect to the magnet,
the first clasp arm and the second clasp arm are magnetically preloaded into a closed position, and
the first clasp arm and the second clasp arm are configured to be opened to receive the container passively by inserting the container.

19. The device of claim 18, wherein the first pivot axis is arranged further away from a receiving side, on which the container is received by the device, than the second pivot axis.

20. A treatment device for treating a container in a beverage filling plant, comprising:
a treatment carousel; and
the device of claim 18 arranged on the treatment carousel.

* * * * *